United States Patent
Nehushtan

(10) Patent No.: US 9,635,544 B2
(45) Date of Patent: *Apr. 25, 2017

(54) CELLULAR DEVICE SECURITY APPARATUS AND METHOD

(71) Applicants: Rafi Nehushtan, Yahud (IL); Refael Nehushtan, Ramat-Gan (IL)

(72) Inventor: Rafi Nehushtan, Yahud (IL)

(73) Assignees: Rafi Nehushtan, Yahud (IL); Refael Nehushtan, Ramat-Gan (IL)

( * ) Notice: Subject to any disclaimer, the term of this patent is extended or adjusted under 35 U.S.C. 154(b) by 90 days.

This patent is subject to a terminal disclaimer.

(21) Appl. No.: 14/591,108

(22) Filed: Jan. 7, 2015

(65) Prior Publication Data

US 2015/0126159 A1 May 7, 2015

Related U.S. Application Data

(63) Continuation of application No. 14/287,098, filed on May 26, 2014, now Pat. No. 8,934,864, which is a (Continued)

(51) Int. Cl.
*H04M 1/66* (2006.01)
*H04W 8/22* (2009.01)
(Continued)

(52) U.S. Cl.
CPC .............. *H04W 8/22* (2013.01); *H04L 63/083* (2013.01); *H04W 12/06* (2013.01); *H04W 12/08* (2013.01);
(Continued)

(58) Field of Classification Search
CPC ....... H04W 12/08; H04W 8/22; H04W 12/12; H04W 12/06; H04L 63/083; H04L 67/34;
(Continued)

(56) References Cited

U.S. PATENT DOCUMENTS 3,891,974 A * 6/1975 Coulter ................. G06F 9/4843
703/13
5,060,295 A 10/1991 Borras et al.
(Continued)

FOREIGN PATENT DOCUMENTS

GB 2362543 11/2001
JP 2003-304322 10/2003
(Continued)

OTHER PUBLICATIONS

International Preliminary Report on Patentability Dated Jul. 5, 2006 From the International Preliminary Examining Authority Re. Application No. PCT/IL2005/000264.
(Continued)

*Primary Examiner* — Mahendra Patel

(57) ABSTRACT

A cellular communication device has one or more access modes which allow reading and writing of data, for example to change its settings, for example passwords and even the entire operating system and also permitting access to personal information such as the user's telephone book. To prevent cloning and like illegal access activity, the device is configured by restricting access to such data access modes using a device unique security setting. The setting may be a password, preferably a one-time password, or it may be a unique or dynamic or one time configuration of the codes for the read and write instructions of the data mode. There is also disclosed a server, which manages the security settings such that data mode operates during an active connection between the device and the server, and a secure communication protocol for communicating between the server and the cellular device.

20 Claims, 8 Drawing Sheets

Related U.S. Application Data continuation of application No. 14/040,756, filed on Sep. 30, 2013, now Pat. No. 8,737,963, which is a continuation of application No. 10/839,148, filed on May 6, 2004, now Pat. No. 8,548,429.

(60) Provisional application No. 60/550,305, filed on Mar. 8, 2004.

(51) Int. Cl.
    *H04L 29/06*   (2006.01)
    *H04W 12/06*   (2009.01)
    *H04W 12/08*   (2009.01)
    *H04W 12/12*   (2009.01)
    *H04W 88/02*   (2009.01)
    *H04M 1/70*    (2006.01)

(52) U.S. Cl.
    CPC ......... *H04W 12/12* (2013.01); *H04L 63/0838* (2013.01); *H04M 1/70* (2013.01); *H04W 88/02* (2013.01)

(58) Field of Classification Search
    CPC ... H04L 63/0838; G06F 11/1402; H04M 1/70
    USPC ............. 455/410, 422.1, 411; 380/240
    See application file for complete search history.

(56) References Cited

U.S. PATENT DOCUMENTS

| | | | | |
|---|---|---|---|---|
| 5,414,753 | A | 5/1995 | Ehara | |
| 5,673,317 | A | 9/1997 | Cooper | |
| 5,828,956 | A | 10/1998 | Shirai | |
| 5,842,124 | A | 11/1998 | Kenagy et al. | |
| 5,887,250 | A | 3/1999 | Shah | |
| 6,014,651 | A * | 1/2000 | Crawford | G06F 9/5061 705/34 |
| 6,026,293 | A | 2/2000 | Osborn | |
| 6,052,600 | A | 4/2000 | Fette et al. | |
| 6,148,197 | A | 11/2000 | Bridges et al. | |
| 6,223,290 | B1 | 4/2001 | Larsen et al. | |
| 6,259,908 | B1 * | 7/2001 | Austin | H04W 12/08 455/411 |
| 6,268,879 | B1 | 7/2001 | Sato | |
| 6,301,666 | B1 | 10/2001 | Rive | |
| 6,385,730 | B2 | 5/2002 | Garrison | |
| 6,463,298 | B1 | 10/2002 | Sorenson et al. | |
| 6,502,193 | B1 | 12/2002 | Barber | |
| 6,510,350 | B1 | 1/2003 | Steen, III et al. | |
| 6,550,010 | B1 | 4/2003 | Link, II et al. | |
| 6,611,913 | B1 | 8/2003 | Carroll et al. | |
| 6,628,934 | B2 | 9/2003 | Rosenberg et al. | |
| 6,633,981 | B1 | 10/2003 | Davis | |
| 6,671,687 | B1 | 12/2003 | Pederson et al. | |
| 6,738,636 | B2 * | 5/2004 | Lielbriedis | H04L 12/5895 455/412.1 |
| 6,745,325 | B1 * | 6/2004 | Gavlik | G06F 8/65 709/221 |
| 6,754,895 | B1 | 6/2004 | Bartel et al. | |
| 6,826,762 | B2 | 11/2004 | Shell et al. | |
| 6,829,492 | B2 | 12/2004 | Aerrabotu | |
| 6,856,818 | B1 | 2/2005 | Ford | |
| 6,880,079 | B2 | 4/2005 | Kefford et al. | |
| 7,054,306 | B2 * | 5/2006 | Kuo | H04L 63/0428 370/352 |
| 7,069,452 | B1 | 6/2006 | Hind et al. | |
| 7,134,047 | B2 * | 11/2006 | Quach | G06F 11/1641 712/229 |
| 7,177,915 | B2 | 2/2007 | Kopchick et al. | |
| 7,197,297 | B2 | 3/2007 | Myles et al. | |
| 7,561,691 | B2 | 7/2009 | Bligjt et al. | |
| 7,574,197 | B1 | 8/2009 | Rebello | |
| 7,587,463 | B2 * | 9/2009 | Sugita | G06F 8/65 359/455 |
| 7,667,572 | B2 | 2/2010 | Husak et al. | |
| 7,693,976 | B2 | 4/2010 | Perry et al. | |
| 8,295,808 | B2 | 10/2012 | Gehrmann et al. | |
| 8,347,104 | B2 | 1/2013 | Pathiyal | |
| 8,544,084 | B2 | 9/2013 | Owen et al. | |
| 8,548,429 | B2 * | 10/2013 | Nehushtan | H04L 63/083 324/715 |
| 8,737,963 | B2 * | 5/2014 | Nehushtan | H04L 63/083 379/161 |
| 8,934,864 | B2 * | 1/2015 | Nehushtan | H04L 63/083 379/161 |
| 2002/0083178 | A1 | 6/2002 | Brothers | |
| 2002/0144151 | A1 | 10/2002 | Shell et al. | |
| 2002/0186846 | A1 | 12/2002 | Nyberg et al. | |
| 2003/0027563 | A1 * | 2/2003 | Herle | G06F 8/65 455/419 |
| 2003/0063071 | A1 * | 4/2003 | Wyatt | G06F 13/102 345/172 |
| 2003/0101347 | A1 | 5/2003 | Letsinger | |
| 2003/0204726 | A1 | 10/2003 | Kefford et al. | |
| 2003/0226040 | A1 | 12/2003 | Challener et al. | |
| 2003/0229791 | A1 * | 12/2003 | De Jong | G06F 21/31 713/182 |
| 2004/0177270 | A1 | 9/2004 | Little et al. | |
| 2004/0192303 | A1 | 9/2004 | Puthenkulam | |
| 2004/0203601 | A1 | 10/2004 | Morriss et al. | |
| 2004/0235455 | A1 * | 11/2004 | Jiang | G01V 3/087 455/411 |
| 2005/0086328 | A1 * | 4/2005 | Landram | H04L 67/34 709/220 |
| 2005/0197099 | A1 | 9/2005 | Nehushtan | |
| 2014/0031013 | A1 | 1/2014 | Nehushtan | |
| 2014/0256289 | A1 | 9/2014 | Nehushtan et al. | |
| 2015/0126160 | A1 | 5/2015 | Nehushtan | |

FOREIGN PATENT DOCUMENTS

| | | |
|---|---|---|
| KR | 20010056947 A * | 7/2001 |
| RU | 2378796 | 1/2010 |
| WO | WO 02/12985 | 2/2002 |
| WO | WO 2005/086513 | 9/2005 |

OTHER PUBLICATIONS

Official Action Dated Mar. 17, 2008 From the US Patent and Trademark Office Re. U.S. Appl. No. 10/839,148.
Official Action Dated Jul. 26, 2007 From the US Patent and Trademark Office Re. U.S. Appl. No. 10/839,148.
Written Opinion Dated Apr. 26, 2006 From the International Preliminary Examining Authority Re. Application No. PCT/IL2005/000264.
Advisory Action Before the Filing of an Appeal Brief Dated Mar. 26, 2010 From the US Patent and Trademark Office Re. U.S. Appl. No. 10/839,148.
Communication Pursuant to Article 96(2) EPC Dated Nov. 7, 2007 From the European Patent Office Re. Application No. 05709152.2.
Examination Report Dated Nov. 11, 2008 From the Government of India, Patent Office, Intellectual Property Building Re. Application No. 2580/KOLNP/2006.
International Search Report and the Written Opinion Dated Jul. 1, 2005 From the International Searching Authority Re. Application No. PCT/IL2005/000264.
Interview Summary Dated Jun. 16, 2011 From the US Patent and Trademark Office Re. U.S. Appl. No. 10/839,148.
Notice of Allowance Dated Jun. 6, 2013 From the US Patent and Trademark Office Re. U.S. Appl. No. 10/839,148.
Notice of Allowance Dated Jan. 17, 2014 From the US Patent and Trademark Office Re. U.S. Appl. No. 14/040,756.
Notice of Allowance Dated Aug. 28, 2014 From the US Patent and Trademark Office Re. U.S. Appl. No. 14/287,098.
Notice of Non-Compliant Amendment (37 CFR 1.121) Dated Jun. 2, 2009 From the US Patent and Trademark Office Re. U.S. Appl. No. 10/839,148.
Official Action Dated Sep. 1, 2011 From the US Patent and Trademark Office Re. U.S. Appl. No. 10/839,148.

(56) References Cited

OTHER PUBLICATIONS

Official Action Dated Dec. 13, 2010 From the US Patent and Trademark Office Re. U.S. Appl. No. 10/839,148.
Official Action Dated Sep. 18, 2009 From the US Patent and Trademark Office Re. U.S. Appl. No. 10/839,148.
Request Dated Feb. 26, 2009 From the ROSPATENT, Federal Government Institution, Federal Institute of Industrial Property of the Federal Service for Intellectual Property, Patents and Trademarks of the Russion Federation Re. Application No. 2006133638 and Its Summary in English.
Official Action Dated Jun. 13, 2016 From the US Patent and Trademark Office Re. U.S. Appl. No. 14/591,947.
Boncella "Wireless Security: An Overview", Communications of the Association for Information Systems, 9: 269-282, 2002.
Notice of Allowance Dated Dec. 23, 2016 From the US Patent and Trademark Office Re. U.S. Appl. No. 14/591,947. (25 pages).

\* cited by examiner

CELLULAR DEVICE SECURITY APPARATUS AND METHOD

RELATED APPLICATIONS

This application is a continuation of U.S. patent application Ser. No. 14/287,098 filed on May 26, 2014, which is a continuation of U.S. patent application Ser. No. 14/040,756 filed on Sep. 30, 2013, now U.S. Pat. No. 8,737,963, which is a continuation of U.S. patent application Ser. No. 10/839,148 filed on May 6, 2004, now U.S. Pat. No. 8,548,429, which claims the benefit of priority of U.S. Provisional Patent Application No. 60/550,305 filed on Mar. 8, 2004. The contents of the above applications are all incorporated by reference as if fully set forth herein in their entirety.

FIELD AND BACKGROUND OF THE INVENTION

The present invention relates to cellular device security apparatus and methods and, more particularly, but not exclusively to a security system for protection of data and access thereto, including read and write access to configuration data, in a cellular telephony device.

A security vulnerability exists in cellular devices. In even the most secure of current devices it is currently possible to read sensitive information from a cellular device (source) and write it into a new cellular device (destination) thus making the destination device identical to the source device with regards to the cellular network. This enables the destination device to make calls, which are then billed to the source device. Such sensitive information may include device information such as the network identity of the device. It may also include personal information such as the user's personal telephone book.

Exploiting the same vulnerability it is also possible to copy sensitive information from a source device to a destination device, thus enabling an end-user device upgrade without the knowledge of the cellular provider. Likewise it is possible to steal a device in one country and sell it in another country after a new operating system has been written into the stolen device.

A cellular device contains the following unique information items that allow any particular device to be identified uniquely:

1. ESN: Electronic Serial Number. A unique number supplied by the manufacturer of the cellular device.

2. NUM: The cellular device's phone number. supplied by the cellular provider.

3. A-KEY: Authentication key. Generated, by Synacom Technologies Inc. of San Jose, Calif., USA, for each cellular device and cellular provider separately, supplied by the manufacturer and used for authenticating the identity of a cellular device by the cellular provider.

4. SSD: An identifier created by the cellular network in combination with additional information from the cellular provider's database and used to identify the cellular device when a call is being made.

These four information items are rightly regarded as being extremely sensitive. They are generally located in the cellular device along with the operating system located on the chipset.

DM (Data Mode)

The DM is a mode in which the device allows any access to the device to change settings and/or accepts commands, via its serial interface, which can be used to read and write information. Setting the device to DM enables reading and writing of data via COM, USB, IR, RF, Bluetooth and any other available interface on the cellular device. There exists a data mode entry command for causing the device to enter data mode, and a code, for example a keypad code, which is required in order to enter DM. The DM code and/or command, is typically unique for each manufacturer.

Cloning a Cellular Device:

Using data mode it is possible to clone a cellular device. The devices may be cloned using one of the following three procedures:

Reading the A-KEY, SSD, ESN and NUM information fields from a source device and writing them into a destination device.

Reading the A-KEY, ESN and NUM information fields from a source device and writing them into a destination device, and then requesting a "SSD update" operation from the cellular provider to receive a valid SSD field.

Reading the SSD, ESN and NUM information fields from a source device and writing them into a destination device.

The A-KEY, SSD, ESN and NUM information fields are all readable from the cellular devices in one way or another.

A single cellular device can be cloned to multiple destination devices, all of which will consequently generate calls billed to the original device.

There are several techniques to read the A-KEY, SSD and the ESN information fields and to write them on a new device. One possibility comprises using a serial RS-232 or USB cable to connect the source cellular device to a personal computer and via a program to read and write these fields from the device's operating system.

The cellular devices may be divided into two basic types, devices without protection, in which the information is readable via the operating system, and devices with password protection. The password is a sixteen (16) hexadecimal digit string (which amounts to eight binary octets). Cracking this password is presumably very difficult. When the password is known, the ESN, A-KEY, SSD and NUM fields are accessible and can be read or written. The password is currently manufacturer specific, and therefore if broken once, all devices made by the same manufacturer become vulnerable.

The above-described methods for reading and writing information fields from the devices likewise enable reading and writing the device's operating system. Some devices have a protection password but it is still possible to read the operating system without knowing the protection password, and thus it is possible to obtain the password.

Hacking a Cellular Device:

Cellular devices may be categorized into two general kinds:

1. Devices without passwords: In devices where the data read and data write functions are not protected by a password, the operating system contains two separate read and write command sets: one set for upgrading the operating system and one set for reading and writing from the operating system's memory. These commands can be used directly by a hacker to read the information if the device is the source device, or to write the information if the device is the destination device.

2. Devices with passwords: A protection password is encoded into the device's operating system and thus can be obtained from the binary operating system file obtainable on the internet, by theft from the cellular providers or by reading the data from the device.

It is possible to alter the password or to use additional constantly based, countermeasures to protect the cellular device. The term "constantly based" refers typically to passwords which are different for different manufacturers, different device models, different cellular providers, different operating systems and versions etc. However a single password applies to numerous individual devices.

It is noted that the passwords themselves, as well as any additional countermeasures, can be decoded from the operating system's binary file, and the binary file has to be distributed to all the cellular providers who use cellular telephones from the given manufacturer. The passwords are thus as secure as the weakest provider.

Another method is to obtain the mobile telephone management or PST program which is used to program the cellular devices. PST is a generic term for programs produced by the manufacturers that are given to the network operators to maintain the cellular device base. The PST program may then be analyzed, thus obtaining the passwords.

Such an analysis is possible due to the fact that the PST program is a standalone program.

The DIRECTORY field of the mobile telephone, which is a location in which sensitive information is stored, is accessible for reading and writing via the operating system or keypad codes. Therefore a device's identification in the data network can be obtained and altered to identify itself as a different device.

In addition, the operating system can be replaced without a hacker being required to have any knowledge of the protection password. Such a replacement can be used to remove any new safeguards inserted into the new version of the operating system, thus leaving the device vulnerable with an old version of the operating system.

The replacement of the operating system can also be used to change the language of the operating system when a cellular device is stolen in one country and sold in another country.

As mentioned above, typically, cellular devices have at least two sets of read and write instructions: One set is for upgrading the operating system and one set is for communicating with information fields within the operating system.

A further point that is mentioned is that when sending an SMS message, the sender's phone number is a data field which may be filled manually by the user and thus a sender can appear to be someone else in the eyes of the receiver.

Cloning software is available from the following exemplary sources:

The UniCDMA cloning program is available from cdmasoftware@ukr.net;

The NVtool cloning program is available from certain forums;

The GTRAN CDMA 1× DATA CARD (800M)_PRL-Ver 3.1 program is available from certain forums;

The DM cloning program, by Qualcom, is also available from certain forums.

There is thus a widely recognized need for, and it would be highly advantageous to have, a cellular device security system in which access to the data mode is devoid of the above limitations.

SUMMARY OF THE INVENTION

According to one aspect of the present invention there is provided a cellular communication device having an access mode for allowing reading and writing of data to change settings on said cellular communication device, said device being configured with an access restrictor to restrict use of said access mode in accordance with a device unique security setting.

Preferably, the device unique security setting is comprised physically on said device.

Additionally or alternatively, the device unique security setting is a software setting.

In an embodiment, said device unique security setting is a coding configuration for data read or data write instructions.

Additionally or alternatively, said device unique security setting is a dynamic password.

Preferably, the dynamic password is a one-time password.

Preferably, the device unique security setting is constructed using at least one device specific data item and at least one random data item.

In a particular embodiment of the above, said device unique security setting is constructed using two device specific data items and two random data items.

Preferably, said device unique security setting is dynamically changed over a series of data access mode operations.

Preferably, said device unique security setting is accessible only via a predetermined communication protocol.

Preferably, said predetermined communication protocol comprises a specified sequence of communication packets.

Preferably, said predetermined communication protocol comprises a specified structure of communication packets.

The device may be in physical association with a client program for managing said predetermined communication protocol.

Preferably, said client program is configured to set said cellular communication device into said data access mode for accessing of data when it is satisfied that said device unique security setting is correct.

According to a second aspect of the present invention there is provided a cellular communication device having a data access mode for allowing reading and writing of data to change settings on said cellular communication device, said device being configured to restrict entry into said data access mode to an active connection involving a predetermined secure server.

Preferably, said active connection is identifiable via a device unique security setting.

Preferably, said device unique security setting is a coding configuration for data read or data write instructions.

Preferably, said device unique security setting is a dynamic password.

In an embodiment, said dynamic password is a one-time password.

In an embodiment, said device unique security setting is constructed using at least one device specific data item and at least one random data item.

Preferably, said device unique security setting is constructed using two device specific data items and two random data items.

Preferably, said device unique security setting is dynamically changed over a series of data access mode operations.

Preferably, said device unique security setting is accessible only via a predetermined communication protocol.

Preferably, said predetermined communication protocol comprises a specified sequence of communication packets.

The device may be provided in association with a client program for managing said predetermined communication protocol.

Preferably, said client program is configured to set said cellular communication device into said data access mode when it is satisfied that said device unique security setting is correct.

The client program may be configured to check regularly using said protocol that said connection is active, and to disable said data access mode when said connection is not active.

According to a third aspect of the present invention there is provided a server for supporting data configuration operations at cellular communication devices connecting remotely via a network, the server comprising a database of unique secure data regarding said cellular communication devices and mode access functionality for using said unique secure data to generate device specific data mode entry commands required at said cellular communication devices, to permit entry into data mode at said cellular communication devices.

Preferably, the unique secure data seeds a device unique security setting.

The device unique security setting may be a coding configuration for data mode entry, data read or data write instructions.

The device unique security setting may be a dynamic password.

The dynamic password may be a one-time password.

The device unique security setting may be constructed using at least one device specific data item and at least one random data item.

Preferably, the device unique security setting is constructed using two device specific data items and two random data items.

The device unique security setting may be dynamically changed over a series of data mode operations.

The device specific data mode entry command may be accessible only via a predetermined communication protocol.

The predetermined communication protocol may comprise a specified sequence of communication packets.

The predetermined communication protocol may comprise a specified structure of communication packets.

The server may be located in association with a client program for managing said predetermined communication protocol.

Preferably, the client program is configured to set said cellular communication device into said data mode when it is satisfied that said device specific data mode entry setting is correct.

The client program may be configured to set said cellular communication device to disable said data mode when it appears that a connection with said server is not active.

According to a fourth aspect of the present invention there is provided a method of restricting access to a reconfiguration mode of each one of a plurality of cellular communication devices, the method comprising:

holding device dependent information of each of said plurality of cellular communication devices, using said device dependent information to create device unique security settings for said plurality of devices, and configuring said plurality of devices such that a respective device unique security setting is required to support said reconfiguration mode.

Preferably, the device dependent information seeds said device unique security setting.

Preferably, the unique security setting is a coding configuration for data read or data write instructions of said configuration mode.

The unique security setting may be a dynamic password.

The dynamic password may be a one-time password.

Preferably, said device unique security setting is constructed using at least one device specific data item and at least one random data item.

Preferably, said device unique security setting is constructed using two device specific data items and two random data items.

Preferably, said device unique security setting is dynamically changed over a series of data mode operations.

According to a fifth aspect of the present invention there is provided a cellular communication device capable of communication with an external source for configuration of said cellular communication device, said cellular communication device comprising a configuration enabler for enabling or disabling said communication in accordance with a device unique security setting.

Preferably, said device unique security setting is comprised physically on said device.

Alternatively, said device unique security setting is a software setting.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
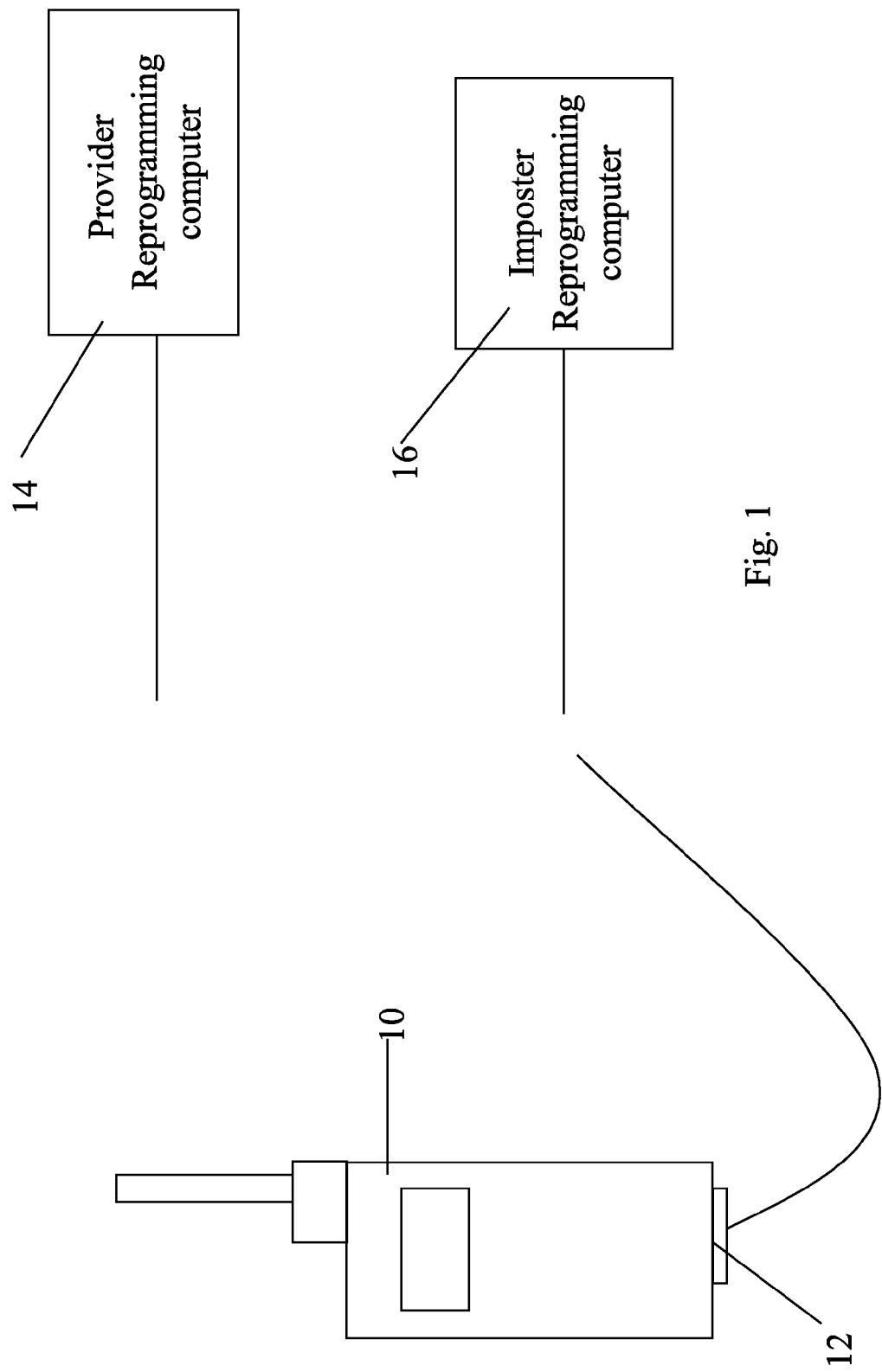
FIG. 1 is a simplified diagram showing a cellular telephone having a freely accessible data port for data mode access to anyone who knows the data mode access code.

The present embodiments comprise a method and apparatus for protection of the data mode of the cellular telephony device. Preferably the data mode is protected by a password, and preferably the password is device specific. In a further preferred embodiment the password is dynamic and ideally is a one-time password. An advantage of a one-time password is that even if it is picked up by a sniffer program it is already too late as the cellular device now expects a different password. In an alternative embodiment the read and write instructions and/or data mode entry instructions are assigned different codes. Again this is preferably done in such a way that the codes are different for different devices. Again preferably it is done dynamically and preferably there is a one-time configuration for each time the device enters data mode.

Additionally or alternatively data mode protection is provided by only allowing access to the data mode operations whilst a live connection is available to a predefined secure server or other network accessible security arrangement.

Additionally or alternatively data mode protection is provided by only changing the data mode keypad code and/or instruction so that they are unique for each device.

Additionally or alternatively data mode protection is provided by disabling the data mode access until such access is required by an authorized party, at which time the cellular device is signaled to accept commands. It is possible that such a signal be provided via a physical interface or via the cellular network or via any other wireless interface or via any external electromagnetic influence.

A preferred embodiment combines restricting the data access mode entry, protecting the read and write instructions with a password and changing the read and write instructions so that all the passwords, instructions and codes are unique for each device.

Returning to the password embodiment, the password may be constructed from one or more of the unique information items stored on each cellular device, such as the A-key, together with one or more dynamically changing or random or randomly changing data items. In a preferred embodiment two of the cellular device's unique information items are used together with two other random items.

In a further embodiment of the present invention, a server is provided for each cellular provider or like body, which manages the unique and preferably dynamic passwords for each of the devices registered with that cellular provider. The server provides the passwords in real time as data mode is entered, and thus the cellular device is only able to enter data mode when a connection is present to the given server. This is acceptable for legitimate use, since data mode is only needed for initial setup, later upgrading and other technical services which only the cellular provider carries out. Illegitimate use however becomes very difficult. In particular, even if an illegitimate user manages to crack the password for a given device, all he gains is a single device. The operation is uneconomic, by contrast to the current state of the art where a single password gives access to a very large number of devices.

The principles and operation of a cellular telephony device according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a standard mobile communication device 10. Device 10 may work with any of the mobile telephony standards such as GSM, CDMA, TDMA, 1×, CDMA 2000, GPRS and the like. Each of these standards provides a high level of protection for communication over the airwaves to prevent eavesdropping and the like. In addition to communication over the airwaves, the mobile communication device 10 has a data input 12 which allows the cellular device to be connected to a computer or like client device 14 to be programmed. The cellular device may need to be programmed to provide it with an operating system, to tell it what its telephone number is and the like, to make particular services available to the user and to reprogram and upgrade the cellular device during its lifetime.

Unfortunately, cellular device 10 has no way of knowing whether it is currently being connected to legitimate reprogramming client device 14, or to an imposter's reprogramming client device 16. As discussed in the background, the imposter's reprogramming client may seek to carry out cloning, or may introduce older versions of the operating system, having known weaknesses that the imposter may subsequently exploit or carry out a range of other telecommunications crimes. The cellular device 10 in fact enters a data mode in order to be reprogrammed and in that data mode all of the above activities are typically possible.

Again, as discussed in the background, password protection of the data mode is known. However, since data mode is needed for initial programming of the device, the passwords tend to be set for all of the devices of a given manufacturer or for certain models or for particular batches of those models. The passwords are thus shared between thousands or millions of devices, and have to be distributed amongst all of the cellular providers. Only one weakness at one provider, or one successful attempt to attack the password directly, means that all the devices sharing the same password are compromised.

Figure 2:
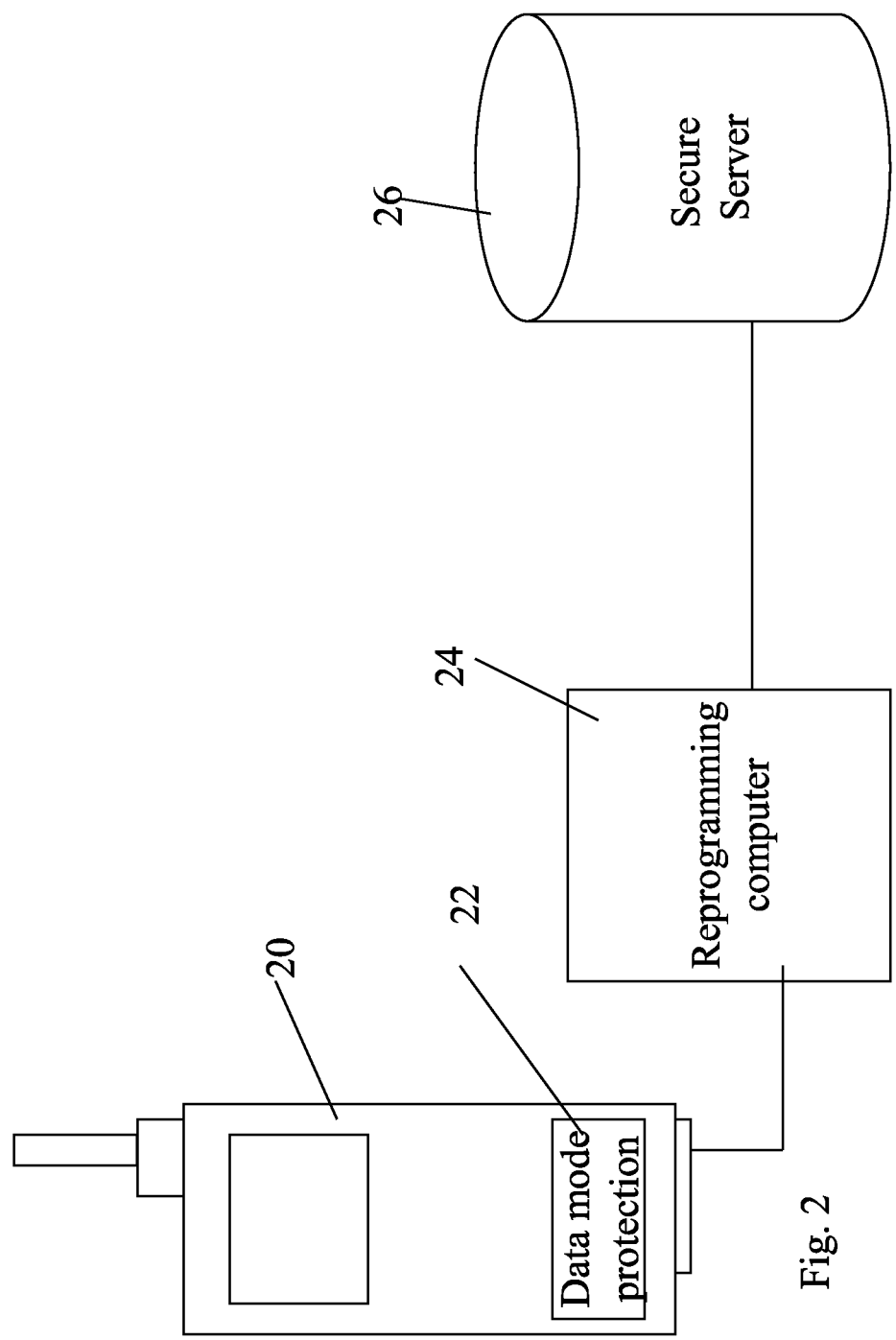
FIG. 2 is a simplified diagram showing a first preferred embodiment of the present invention, in which a cellular telephone is connected through a data connection to a reprogramming device and to a secure server.

Reference is now made to FIG. 2, which shows a cellular communication device 20 connected for upgrading according to an upgrading configuration of a first preferred embodiment of the present invention. Device 20 is in data mode for allowing reading and writing of data to change the settings and generally to allow reprogramming including replacing or updating of the operating system, changing of the telephone number and the like. The device 20 is configured to restrict use of the data mode in accordance with a unique security setting belonging to the device. Thus the data mode cannot be used unless the device unique security setting is provided. In this way it is no longer possible to obtain a single password and thereby compromise a large number of devices.

Within the device 20 itself, a mode management unit 22, otherwise referred to herein as an access restrictor or configuration enabler, may be provided, either as hardware or as software, to manage the device unique security setting to ensure that the data mode can only successfully be entered upon correct use of the device unique security setting, and not otherwise.

The device unique security setting may in one embodiment be a physical setting. Each communication device may be set with a series of jumpers or like switches, which may be set in a unique manner for each device. In another embodiment the setting may be made in software.

In one embodiment, the device unique security setting is not in fact a password as such, but rather is an encoding configuration for the data mode read and write instructions, and the data mode entry command. Each cellular device has different codes for the various read and write instructions of data mode of which there may be several. Thus a reprogramming client device 24 does not know, unless it is told, what the read and write command codes are for the given device and therefore fails to carry out reprogramming. An authorized device however has the necessary information, as will be explained in greater detail below and thus can reprogram the device.

In another embodiment the setting is a password. The password is unique to the individual device. Without the password the data mode cannot be entered and no reprogramming is possible.

In another embodiment the device unique security setting is a dynamic password. That is to say it is a password which is changed at regular intervals. Thus even if the password for a given device is obtained, that password only remains valid for a limited amount of time, after which the device ceases to be compromised.

In a preferred embodiment, the dynamic password is a one-time password, that is to say the password is used only once to enter data mode. Once it has been used it is discarded and a new password is needed for any subsequent entries into data mode. The principles of dynamic and one-time passwords are also applicable to the command encodings as described above. Thus each device can have dynamically changing command codes and even one-time command codes. In a particularly preferred embodiment the commands are in fact changed after every single read or write action.

Several methods for providing dynamic and one-time passwords are described below and persons skilled in the field of cryptography will know of other possibilities.

In one embodiment, the device unique security setting is constructed using one or more of the device specific data items given above in the background and one or more random data items. That is the device specific item or items as well as the random item or items may for example be used to seed either a password generator or command code generator. In a preferred embodiment seeding involves a hashing function. A hashing function is useful because the one-way property of the function enables the mobile device to authenticate the password without it being possible in a realistic time frame for an eavesdropper to reproduce the password without the seed data.

In a specific implementation, the device unique security setting is constructed using two device specific data items and two random or changing data items.

Using the above embodiments, the device unique security setting can be dynamically changed over a series of data mode operations.

In a preferred embodiment of the present invention, the device unique security settings are dynamic and change rapidly. In such a case it is not sufficient for reprogramming computer 24 to be able to obtain the settings. Rather it must have a live connection to a security server 26 which knows or generates the settings.

Security server 26 supports data configuration operations at cellular communication device 20 which connects remotely via a network, for example through its data connection 22 and reprogramming computer 24. Alternatively, the device may be connected via a Bluetooth, RF connection, COM, USB, IR interfaces or any other physical interface. Connection via the cellular network may also be possible, for example by connecting the server side of the system to the cellular provider's provisioning or management networks.

The server preferably comprises a database of unique data of the individual devices as well as an ability to generate passwords or command encodings using that unique data and other random data. The resulting passwords, instructions etc which it generates constitute device specific data mode entry instructions or read and write instructions which are required at the cellular communication devices, and permit entry into data mode at the cellular communication devices.

The cellular device has to be secured in such a way as to enable the cellular provider who bought the device to communicate through the data mode of the device to carry out programming and configuration while preventing everyone else from communicating with the device through the data mode.

In the preferred embodiments the data mode is thus protected with a password or passwords, the passwords being different for each individual cellular device. In alternative embodiments the data communication commands are themselves encoded.

In the password embodiment, the password secures communication with the device via any interface and for any data mode operation including diagnostic and monitoring operations, reading and writing data, and running technician programs etc. The device's default mode will be to wait for a password before entering data mode. All other operations are preferably locked until a password is provided and then only the operations associated with the supplied password are made available. That is to say, in one embodiment it is possible to provide different passwords for different access levels. Various levels can be defined so that different read and write actions require different passwords or successively increasing portions of a larger, more secure password.

The construction of the password or passwords is explained in greater detail hereinbelow.

In the command encoding embodiment, cellular devices without passwords are protected by changing the code numbers for the read, write and data entry mode instructions. As an alternative, it is possible to modify such devices by adding passwords to the operating system so that they protect the device with a password or passwords as described above.

Figure 3:
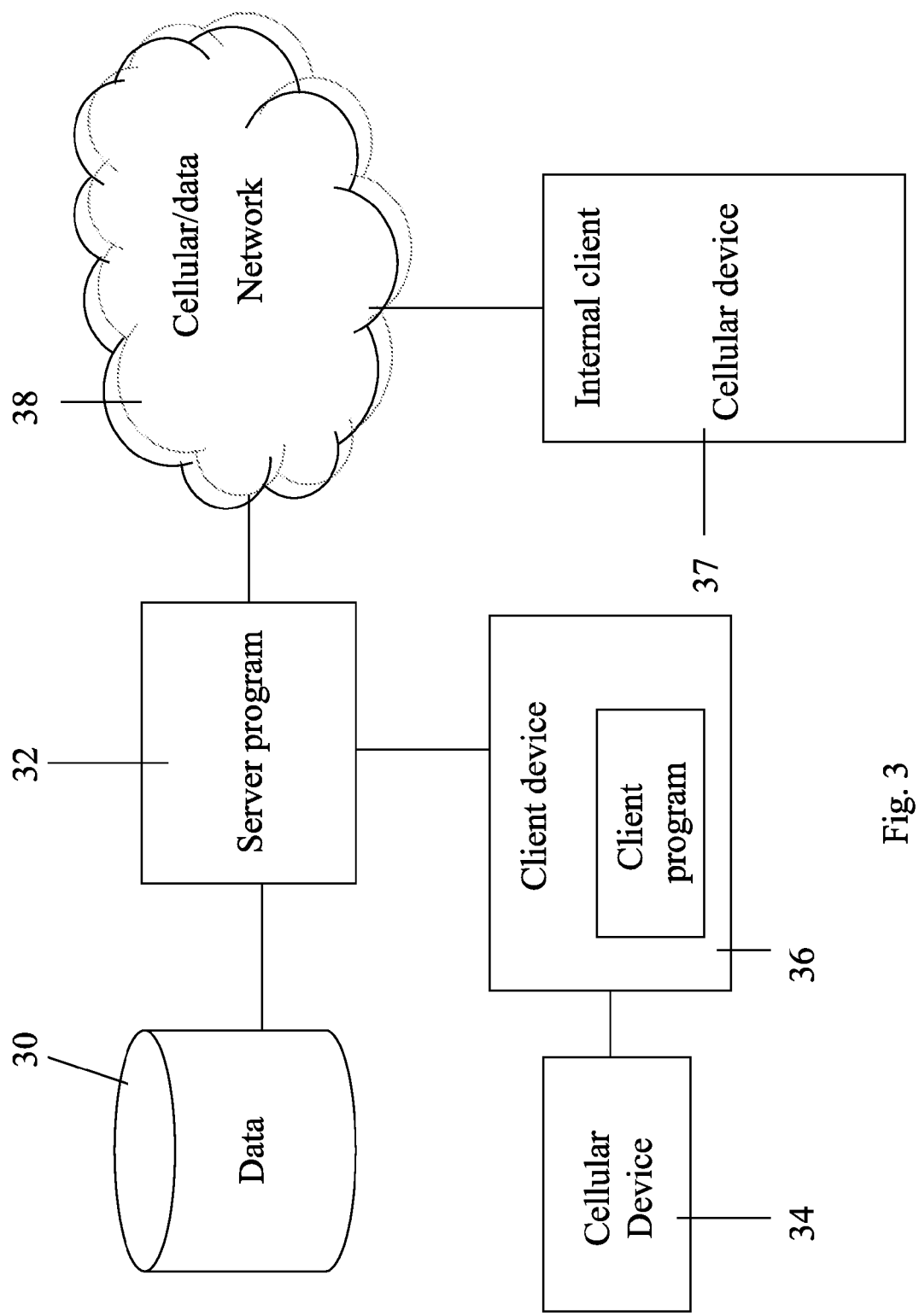
FIG. 3 is a simplified diagram showing the client server aspects of the embodiment of FIG. 2.

Reference is now made to FIG. 3 which shows in greater detail the configuration of FIG. 2. Server 26 comprises a database 30 and a server program 32. The mobile device 34 is preferably associated with a client program 36. Both the server and the mobile devices are associated with a given provider's cellular network 38.

The password or passwords and commands may be saved in a central database 30 located in a secure network, which is preferably unique to each cellular provider. Thus, no cellular provider has access to another cellular provider's database and consequently, to its devices. In the one-time password embodiment the central database may not actually store any passwords but rather the seed information needed at run time to generate the password, which is never used again.

A client-server program system preferably enables the cellular provider to manage the devices when they are physically connected to a client side of the secure system. The devices may be connected as described above via a reprogrammer's computer and the data port of the device. Alternatively, as mentioned above, the device may be connected via a Bluetooth, RF connection, COM, USB, IR interfaces or any other physical interface. Connection via the cellular network 38 may be made available by connecting the server side of the system to the cellular provider's provisioning or management networks.

Server program 32 is preferably provided to supply an interface between the database which contains the information needed to communicate with the cellular device and the client program 36.

The server program preferably contains the algorithms needed to communicate with the cellular device and the client program preferably acts as a remote interface for the server program and, possibly, the GUI.

In an embodiment the algorithms may be located in client program 36 rather than in the server program 32. Client program 36 is preferably part of a client device which the technician carries with him.

Alternatively, the client program may be held within the mobile device 37. In this case the mobile device connects via the cellular or data network 38 and an internal client supports the connection to allow secure modification of the internal parameters of the telephone.

Figure 4:
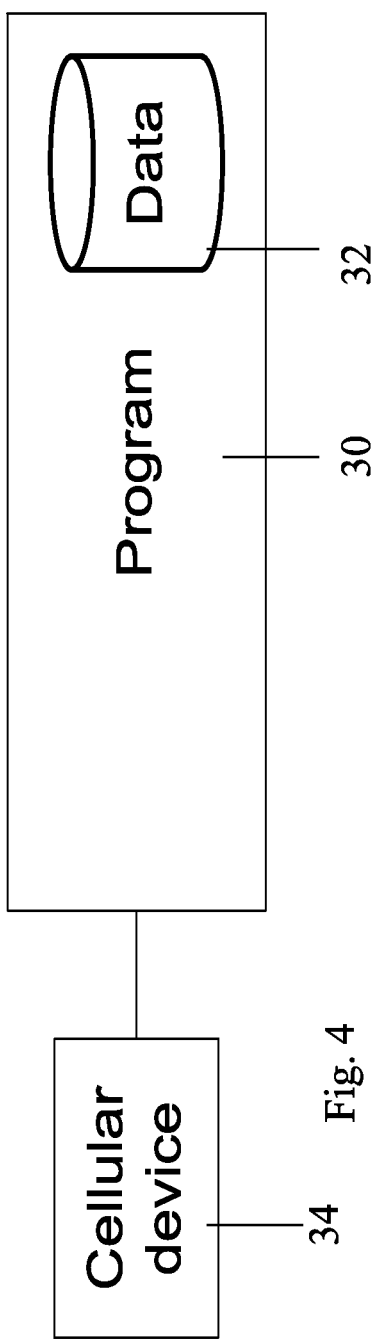
FIG. 4 is a simplified diagram showing another configuration of the client server aspect of the embodiment of FIG. 2, in which the server is provided in standalone format.

The server system can, if desired, be constructed in a standalone mode. Such a standalone mode is shown in FIG. 4. Parts that are the same as in FIG. 3 are given the same reference numerals and are not referred to again except as necessary for understanding the present embodiment. In the standalone mode the mobile device is connected directly to the secure server. Such an arrangement may be appropriate in certain circumstances such as in the case of a cellular provider in a very small country having just a single service center, or in the case of a small scale network provider.

Communication between the client and the server may be encrypted, so as to prevent eavesdroppers from reading sensitive information whilst it is traversing the cellular provider's internal network using sniffer programs.

In one preferred embodiment the only data operations available without a password are changing user information via the cellular device's keypads, for example changing the phone book entries, reading and sending SMSs, and the like.

Devices are typically provided with a keypad code to set the device into DM (Data Mode). In the preferred embodiments this code is altered, as described hereinbelow for the passwords.

In the following, the production of individual passwords or command codes is explained.

Whether considering password values, read instructions, write instructions, DM code or other device commands which are to be changed or added, the values may be constructed as follows:

The construction may use one or more random values, whether numeric, alphabetic, alphanumeric or any other. The random values may be memory areas in the device's operating system or designated fields.

The construction may use a value generated from the contents of the NUM field.

The construction may use a value generated from the contents of the ESN field.

The construction may use a value generated from the contents of the A-KEY field.

The construction may use a value generated from the contents of the SSD field.

The construction may use a product or a function of the contents of one or more of the following value fields:
 NUM field,
 ESN field,
 A-KEY field,
 SSD field, and
 a random value or random values. The random values may be memory areas in the device's operating system or designated fields as before.

The construction may further use a value generated from an algorithm which is time-dependent and generates a different code for every second, minute or time interval. Further variation or alternative variation may then be introduced into the result based upon for example one or more of the following:
 Time.
 Challenge-response from the device's keypad.
 NUM field,
 ESN field,
 A-KEY field,
 SSD field,
 A random value or random values (The random values may be memory areas in the device's operating system or designated fields), and
 A seed value or values.

The above described value is hereinafter designated ALG1.

The value can be changed every time the device is connected to the system so that a one-time password, command or code results.

The password is then preferably required in order to make changes in the cellular device's operating system. Such changes include disabling the write instructions which enable upgrading the operating system, disabling the read commands which can access the operating system program, removing the password or passwords fields from the operating system's binary files and writing them after the operating system has been written into the device, changing the method in which an operating system upgrade is performed, including changing the commands so that they are different for each device, and locking of the commands so that a new operating system may be accepted only after a password has been provided. Providing of the password and upgrading of the operating system may be as follows:
 The system provides a password.
 The device accepts or rejects the password.
 If accepted, the device accepts a new operating system.
 A new password (or the same old password) is written into the device.
 The operating system subsequently rejects any new upgrades until the password has been received again.

A second method for a password controlled operating system upgrade is as follows:

The system waits for a valid password or a command, and a flag is set so that the operating system accepts a new operating system version. The new operating system is now written but with an unset flag.

A new password (or the same old password) may then be written into the device, the flag set and the operating system rendered usable.

In a further security measure, it is possible to configure the system such that once the ESN value has been written into the device via the system, the operating system prevents any subsequent writing to the ESN information field.

The A-KEY value may be set to be only writeable and not readable.

It is possible to change the protection password in devices which have a password and, if possible, to add a password to those devices which do not have a password. The password is preferably unique for each device.

As a further security measure it is possible to provide separate passwords for different operations. The separate passwords may be provided as parts of a longer, more secure, password. Alternatively, they can be completely different passwords.

As mentioned above, in one of the embodiments, it is possible to change the operating system's read and write instructions for the information fields into different values for different devices. It is further possible to change the periodic command which prevents the cellular device from rebooting when in Data Mode (DM).

An additional security measure involves disabling the key codes which enable changing the A-KEY and DIRECTORY fields via the device's keypad. As discussed above, the DIRECTORY field typically contains the information in the NUM field.

Preferred embodiments of the present invention prevent any communication with the device's operating system via any of the device interfaces, whether the Keypad, a USB port, a Com port, an IR port, or any other interface unless a live connection is present to a secure server as described above. The live connection is preferably verified via the above-described single or multiple passwords or via the fact that the connecting device knows the current codes for the data mode instructions.

One way of protecting data mode via a one-time password is to lock data communication, that is DM or Data Mode, with the device's operating system unless a key is entered into the device. The key is different for each device, as explained above, and generated in a similar method to the generation of the passwords and commands explained above, so that it is different for each device and, possibly, time-dependent. The system prompts the user to enter the device's ESN and then provides the user in return with the correct code to enable the device's Data Mode. The device is then connected to the system, and the code is immediately altered, that is to say the mobile telephone is issued with the next key. The next key is preferably encrypted and passed to the mobile telephone electronically as data so that it is not available to the user.

If the device is not connected to the system within a reasonable time after the current key is given out an alert may be written to the central database.

A further security measure comprises disabling the caller number input field when sending an SMS. The contents of the NUM field may be used for the caller number value, thus preventing senders of SMS messages from using false source numbers.

Preferably, in accordance with the present embodiments, each device arrives from the manufacturer at the cellular provider locked with a different password. For example the A-KEY can be used. The password is sent to the cellular provider who bought the device along with the ESN, and A-KEY if that is additional to the password. These are delivered to the cellular provider separately from the devices. It is also possible for the manufacturer to generate a separate password from seed values and then in fact send the seed values to the cellular provider who repeats the calculation process.

If the above security procedures are carried out, then the only two keypad codes that may be left in the device are:

a keypad code to change the contents of the NUM field, and a keypad code to change device's mode to DM (Data Mode).

Subsequently, the client-server software system with central database, as described above in respect of FIGS. 2, 3 and 4, manages the data mode communication with the cellular device so that the cellular provider, and he alone, can perform the following actions:

Upgrading of the cellular device's operating system.

Changing the NUM field.

Changing the A-KEY fields: including initial setting and subsequent modification as necessary.

Setting the ESN field. This is typically a one-time action.

Reading and writing cellular network information fields.

Reading and writing the phone book

Reading and writing additional user information on a large scale such as saved SMS messages, icons, ring tones etc. Clearly the subscriber would wish to use these facilities freely but wholesale copying of the entire address book and the like may be operations that one would wish to protect.

The data mode protection features described herein preferably ensure that the cellular device only accepts changes or return information when connected to the client side of the system of the cellular provider who bought the device. Preferably no information is retrievable and no configuration information can be written without a connection to the system. No changes are admitted if not received from the cellular provider's system. Alternatively the changes need not come from the system, but can only be accepted whilst the cellular device is connected to the cellular provider's system. In one embodiment, the securing of the device may affect all the device's interfaces except the keypad.

Preferred embodiments enable keeping the ESN, NUM, A-KEY and SSD fields secure whilst at the same time enabling them to be changed when needed by simply knowing the correct password. The change may thus be made only by those who are allowed to do so, thus preferably technicians of the cellular provider who purchased the device from the manufacturer.

Returning to FIG. 3 and server program 32 preferably includes a database engine which contains the information need to generate the password or passwords and read and write instructions for the each cellular device. The information contained is one or more of the following fields: ESN, NUM, A-KEY, SSD and random values, according to the type of protection chosen.

The following information may be retained in database 30:

First of all the data base may hold cellular device authentication information, such as ESN, current A-KEY, and a new A-KEY, that is a number sent during current signaling operations to provide the mobile device with a new A-KEY for the next time the system is to communicate with the cellular device. The same may apply to any other field that can be changed remotely, namely that a next key can be sent during a current operation. The database may also hold a device manufacturer and model, a last communication date with the device, a device operating system version, and a password or passwords.

Secondly the database may hold a client identification table. The table may typically hold the following information: a client IP address, a client MAC address, and a client identification string. The database may also hold a device manufacturer table. The table may hold the manufacturer name, and a manufacturer number, thus various arbitrary numbers may be assigned by the system to each manufacturer.

The database may also hold a device model table. The model table may hold data such as the manufacturer number, as described above, and the model name.

The database may also store alerts or abnormal operations detected in the system such as a user requesting a DM enabling code and not subsequently connecting the device to the system.

It is possible that additional information may be kept, such as operations carried out on different devices, when they have been performed and by whom.

It is possible that if the data mode entry keypad code is to be uniquely set for each device, the code (or its seed information) may be kept in the database and the required information may then be provided when needed after the requesting party is properly identified. In a preferred embodiment, the code is replaced after the device has been connected to the system.

If the data mode entry instruction is to be uniquely set for each device, the instruction (or corresponding seed information) may be kept in the database and can be provided when the device has been connected to the system and identified by the user. In a preferred embodiment, the instruction may be replaced after the device has been connected to the system.

As will be understood from the above, transfer of password information is used in preferred embodiments between the client and the server programs. Such transfer is preferably part of an encrypted communication stream protocol. The protocol may for example be implemented over a TCP/IP (v4 or v6) transport protocol. The protocol defines data packets, and the data packets in one preferred embodiment conform to the structure given below in table 1.

TABLE 1

Protocol Packet structure

| Number | Length | Start octet | End octet | Type | Data |
|---|---|---|---|---|---|
| 1 | 2 | 0 | 1 | Number | Total packet length |
| 2 | 2 | 2 | 3 | Number | Packet type |
| 3 | Variable | 4 | X + 3 | Binary | Data (optional field) of length X |

One of the packet types defined in the protocol is the sync packet, whose structure is shown below in table 2. In the sync packet, no data field is available. A sync packet is sent from the client to the server or the server to the client periodically, say every 500 ms. If a sync packet is not received within another period, say 10 seconds, then the side which did not receive the sync packet may disconnect.

TABLE 2

Sync Packet Structure

| Number | Length | Start octet | End octet | Type | Data |
|---|---|---|---|---|---|
| 1 | 2 | 0 | 1 | Number | 4 |
| 2 | 2 | 2 | 3 | Number | 1 |

In the protocol, a client, that is the mobile device, makes a request for a connection to allow data mode. The structure of the Client connect request data packet is that given above in table 1. The data field is structured as shown below in Table 3.

TABLE 3

Structure of the data field in the client connect request packet.

| Number | Length | Start octet | End octet | Type | Data |
|---|---|---|---|---|---|
| 1 | 2 | 0 | 1 | Number | 58 |
| 2 | 2 | 2 | 3 | Number | 2 |
| 3 | 6 | 4 | 9 | Binary | MAC address of the client PC |
| 3 | 16 | 10 | 25 | Binary | IP address of the client PC: If IPv4 is used, the first 4 octets will contain the address, other 12 octets will contain zeroes. |
| 24 | 32 | 26 | 57 | String | Client identification string |

Following the connect request is a server connect acknowledge, which is sent from the server to the client. The data field is structured as shown in table 4

TABLE 4

Structure of the data field in the server acknowledge packet

| Number | Length | Start octet | End octet | Type | Data |
|---|---|---|---|---|---|
| 1 | 2 | 0 | 1 | Number | 134 |
| 2 | 2 | 2 | 3 | Number | 3 |
| 3 | 2 | 4 | 5 | Number | 1: Authenticated. 2: Rejected |
| 4 | 128 | 6 | 133 | String | Error or login message, null terminated |

In the continuation of the protocol the server may make a data request. In such a request the data field preferably contains information to be written to the interface of the cellular device. The data field is structured as shown in Table 5.

TABLE 5 server data request - structure of the data field

| Number | Length | Start octet | End octet | Type | Data |
|---|---|---|---|---|---|
| 1 | 2 | 0 | 1 | Number | Total packet length |
| 2 | 2 | 2 | 3 | Number | 4 |
| 3 | Packet length-4 | 3 | Packet length-4 | Binary | Binary data to be written to the interface to which the cellular device is connected |

In response to the server data request is a client data reply. The data field is structured as shown in table 6 and may contain information read from the cellular device.

TABLE 6

Client data reply, structure of the data field

| Number | Length | Start octet | End octet | Type | Data |
|---|---|---|---|---|---|
| 1 | 2 | 0 | 1 | Number | Total packet length |
| 2 | 2 | 2 | 3 | Number | 5 |
| 3 | Packet length-4 | 4 | Packet length-4 | Binary | Binary data read from the interface to which the device is connected |

In the protocol, the client is able to request a service, such as a given operation in data mode. A Client service request packet has a data field structured as shown in table 7 below.

TABLE 7

Client Service request - structure of the data field

| Number | Length | Start octet | End octet | Type | Data |
|---|---|---|---|---|---|
| 1 | 2 | 0 | 1 | Number | 10 |
| 2 | 2 | 2 | 3 | Number | 6 |
| 2 | 4 | 4 | 7 | Binary | Connected device ESN |
| 3 | 2 | 8 | 9 | Number | Service request: 1. Device initialization. 2. OS upgrade. 3. A-KEY change. 4. NUM change. 5. Read phone book. 6. Write phone book. |

The protocol allows the client device to provide identification information about itself to identify itself to the server. The data field may be structured as shown in Table 8.

TABLE 8

Client identification information packet - structure of the data field

| Number | Length | Start octet | End octet | Type | Data |
|---|---|---|---|---|---|
| 1 | 2 | 0 | 1 | Number | 6 |
| 2 | 2 | 2 | 3 | Number | 7 |
| 3 | 2 | 4 | 5 | Number | Number which identifies connected cellular device manufacturer and model. |

The protocol preferably allows client user authentication. The data field contains the structure shown in table 9.

TABLE 9

Client user authentication - structure of data field

| Number | Length | Start octet | End octet | Type | Data |
|---|---|---|---|---|---|
| 1 | 2 | 0 | 1 | Number | 72 |
| 2 | 2 | 2 | 3 | Number | 8 |
| 3 | 32 | 4 | 35 | String | User name, null terminated. |
| 4 | 32 | 36 | 67 | String | Password, null terminated |
| 5 | 4 | 68 | 71 | Binary | Client IP address |

Having considered the communication protocol, a client program is used at the mobile device to operate the protocol and obtain the information needed to run data mode at the device.

The Client program is generally not located within the mobile device but may be located on another device which connects, physically or otherwise, to the cellular device via a COM, USB or IR interface. For example the client may be located on a computer used by the cellular provider for reprogramming cellular telephones. In another embodiment the technician actually downloads the client program to the cellular device and it connects via a regular wireless connection to the server. This latter embodiment is particularly suitable for cellular enabled palmtop type devices.

The client program initially connects to the server program when executed, preferably via the protocol defined above.

During the course of the connection, Sync packets are sent periodically to and from the server program so that both the server and client know that the connection is still live.

The client program reads and writes data to the cellular device via the selected interface following server request signals and provides return data to the server when data becomes available from the interface.

The graphical user interface (GUI) at the client program preferably prompts the user for a user name and password. After the user has typed the information, a data packet is sent to the server and the client waits for authentication. Until a data packet is received with an "Authenticated" flag, no operations are allowed at the cellular telephone.

There are two possibilities for providing the GUI. One is to provide it as part of the client (Graphic User Interface), the other is to provide it as part of the server so that the client accesses it when connected to the server.

Typical functions of the GUI include selecting an interface for connecting to the mobile device. Thus, such a function may be implemented by opening a dialog box which allows the user to select the connected interface from a list box: say Com1, Com2, Com3, Com4, USB.

A function to select a device type may comprise opening a dialog box which allows the user to select the cellular device type. Thus, two list boxes may be provided, one list box may contain the manufacturer names and the right list box may contain the relevant models for the selected manufacturer, as held by the specific cellular provider.

Before connecting the cellular device to the client, the cellular device has to be changed into DM (Data Mode). In order to permit such a change in mode, communication is required with the server as described above. Thus the client program may send a data packet to the server, using the protocol described hereinabove. In an alternative embodiment the cellular device is first connected to the system and then a data mode entry instruction is sent to the cellular device.

The "Select device type" may then be disabled until an interface has been selected. When the data mode is entered then all or any of the operations listed below may be selected through the GUI. The operations may typically include:

Initializing a new device.
Upgrading the existing device operating system.
Updating the A-KEY.
Setting the device NUM.
Reading a phone book from a connected device.
Writing a saved phone book to a connected device. The writing a phonebook option clearly is only relevant when there is a phonebook to write and thus the option may be disabled until a phone book has been read.

The operations menu is preferably disabled, that is prevented from being selected, until an interface and a device manufacturer and model have been selected.

After selecting one of the above operations, a data packet is preferably sent to the server indicating the service selected. In one embodiment or depending on the operation, the server has to permit the operation. In other cases the server merely notes that the operation has taken place.

The GUI element of the client may in one embodiment reside in the server, as an application which provides remote GUI (such as ASP, ASP.NET, PHP, JavaScript). In such a case the following may apply:

The GUI application may communicate with the server program via a TCP/IP socket or named pipes.

The client program may be a socket server while the server program initiates the communication.

Except for the above two points, operation is the same whether the GUI is located at the client or at the server.

After the device type has been selected, the client preferably sends data packets when data is received via the selected interface, regardless of what operation, if any, it is running. It is optional for the server to identify the cellular device.

Moving now to the server, and the server program connects to the database and reads and writes information from the database and the client programs.

Figure 5:
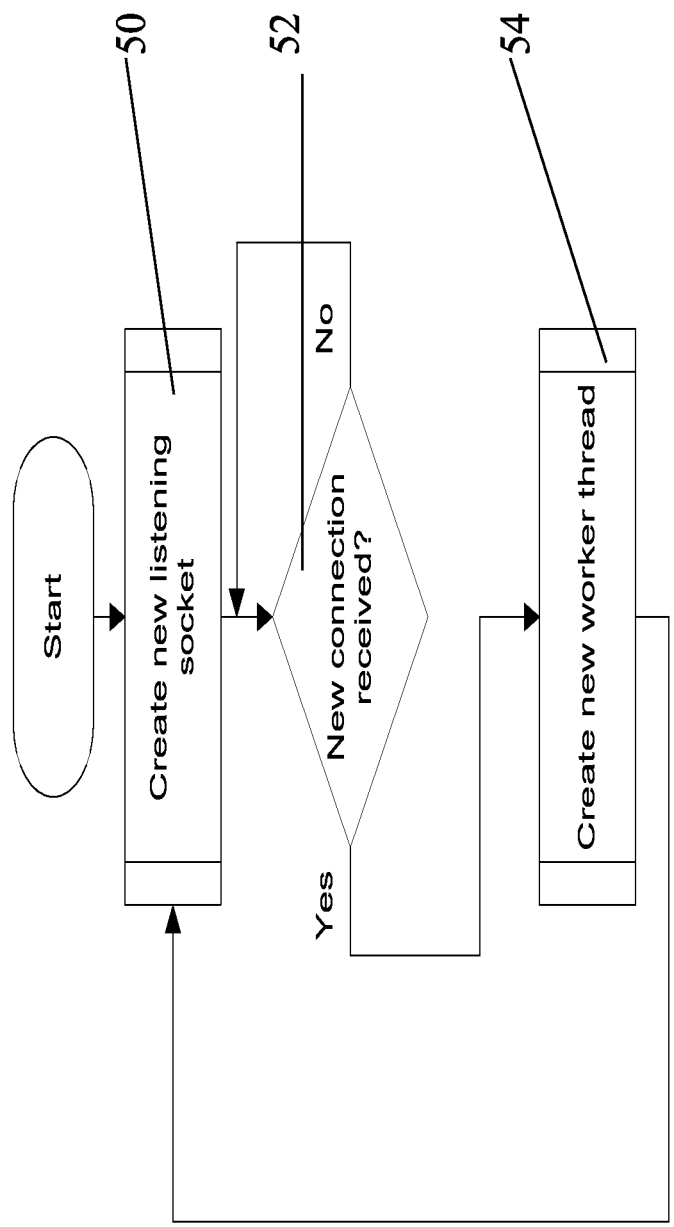
FIG. 5 is a simplified flow diagram illustrating a procedure for communicating between a client and a server for entering and using data mode at a particular cellular device according to a preferred embodiment of the present invention, when the GUI is an integral part of the client.

Reference is now made to FIG. 5, which shows the procedure when the GUI is an integral part of the client program. As shown in FIG. 5, the server program waits for connections from client programs, and when a connection is received it creates a new listening socket, stage 50, waits for a new connection, stage 52, creates a new worker thread for the incoming connection, stage 54 and returns to stage 50. A thread is an authentication system for data packets to ensure that data packets are exchanged in the correct order and only whilst the connection is suitably authenticated.

Figure 6:
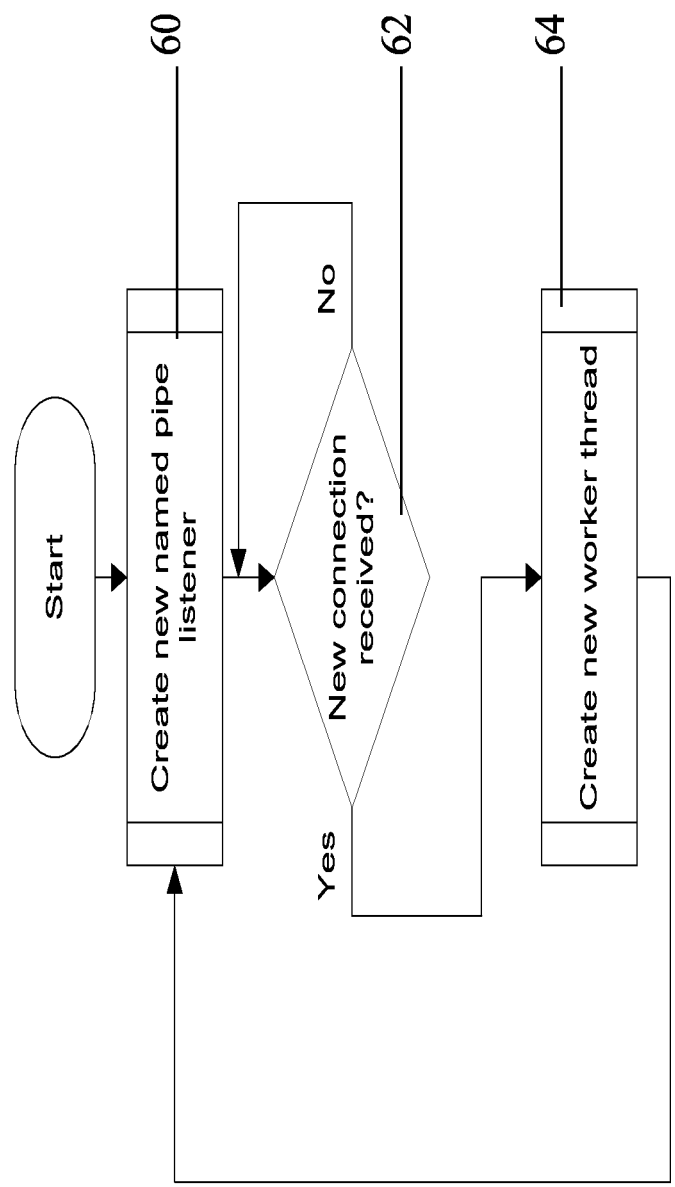
FIG. 6 is a simplified flow diagram illustrating a variation of the procedure of FIG. 5, wherein the GUI is associated with the server.

Reference is now made to FIG. 6, which shows what happens when the GUI is not an integral part of the client program. In FIG. 6 the server creates a new named pipe listener, stage 60, waits for a new connection, 62, creates a new worker thread for the incoming connection, 64 and returns to stage 60.

Figure 7:
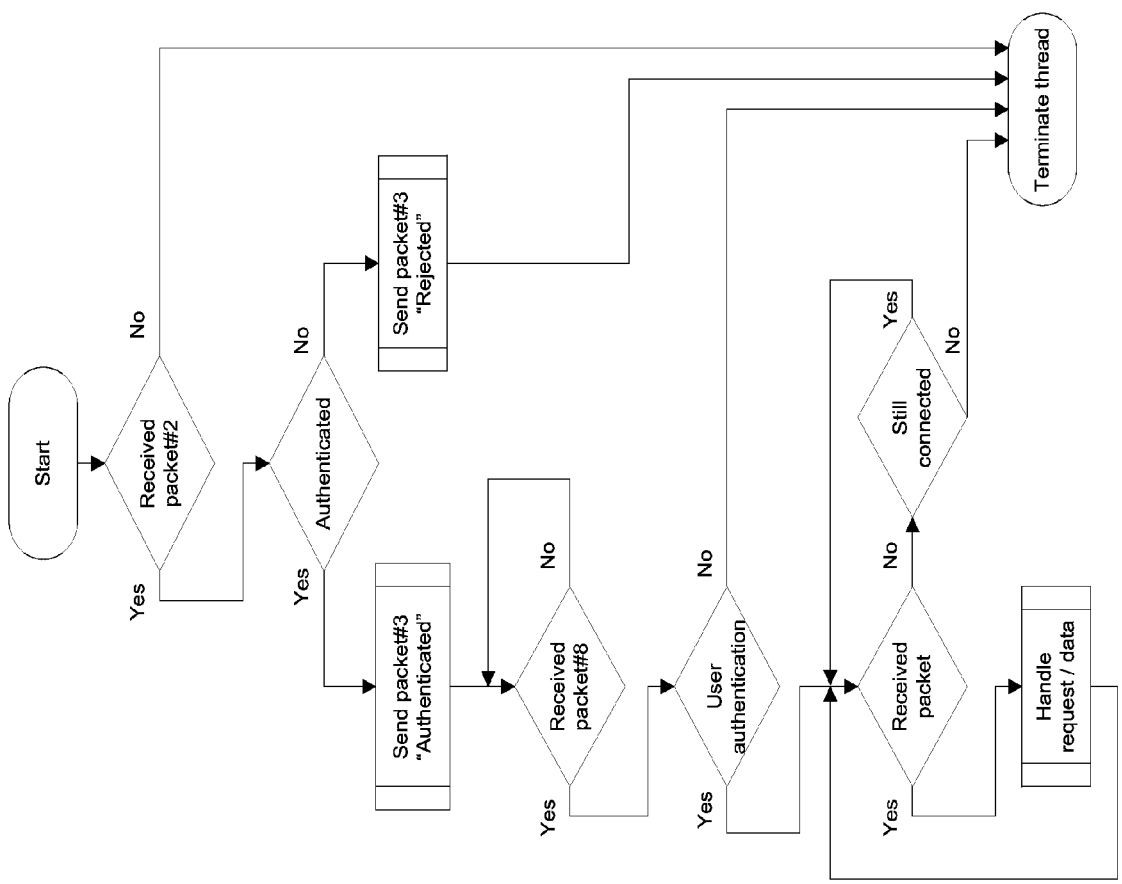
FIG. 7 is a simplified flow chart illustrating a thread procedure for secure tracking of a client connection for use with the embodiment of FIG. 5.
Figure 8:
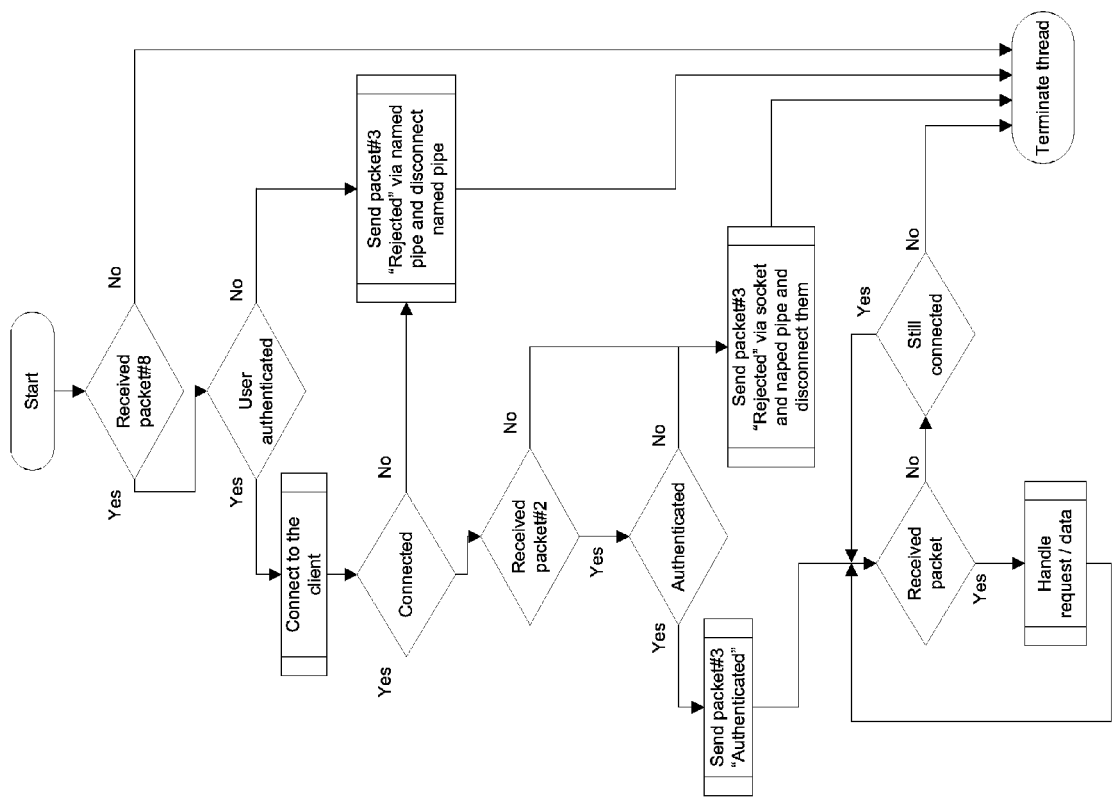
FIG. 8 is a simplified flow chart showing a thread procedure for secure tracking of a client connection for use with the embodiment of FIG. 6.

Reference is now made to FIGS. 7 and 8 which detail the thread procedures for the two GUI cases. FIG. 7 is a flow chart illustrating the thread procedure for the case in which the GUI is an integral part of the client program. In this case the server program waits for connections from client programs. The server waits for a data packet #2. Then if the client IP address and MAC are authenticated it sends a data packet #3 with "Authenticated" flag. Alternatively, if the IP address and MAC are not authenticated then it sends packet #3 with a "Rejected" flag and the thread ends.

Subsequently the server waits for data packet #8. If the user name and password are authenticated, the thread continues, otherwise it exits.

The server then waits for subsequent requests from the client program, and terminates the thread on socket disconnect.

FIG. 8 illustrates the thread procedure for the case in which the GUI is not an integral part of the client program.

The server first receives the client IP address, user name and password from a packet #2. It then waits for a data packet #8 from the consequently named pipe. If the user name and password are authenticated, the thread continues, otherwise it exits. An attempt is made to connect to the client IP. If the connection succeeds the thread continues, otherwise it exits. The server then waits for data packet #2. If the client IP address and MAC are authenticated then it sends packet #3 with an "Authenticated" flag. If not, then it sends packet #3 with a "Rejected" flag and the thread ends.

The server then waits for a disconnect of the named pipe or the socket, or socket packets or commands from the named pipes. It then terminates the thread on the socket or makes a named pipe disconnect. As long as it is still connected, client requests are processed, allowing for data mode operations on the mobile communication device. After handling the request, processing returns to receiving the next packet.

During the existence of a connection two types of periodic messages are sent, regardless of the rest of the processing. Sync messages, made up of the sync packets described above in table 2, are preferably sent at regular intervals from the server program to the client program and vice versa.

Furthermore, when a cellular device is connected to the client program, a data packet is sent at regular intervals to prevent the cellular device from exiting DM (Data Mode) and/or resetting.

Reference was made above to the services which may be supported using the data mode of the cellular telephony device and which may be protected using the present embodiments. It is noted that each service request is preferably received at the server with the connected device's ESN. A short summary of each of the services listed above is now provided.

Device Initialization:

Device initialization according to the preferred embodiments comprises writing a new ESN to the database, reading the A-KEY from the database, generating a new password for the device from a function of one or more of the NUM, ESN, A-KEY fields and random values, writing the password to the database, and setting the password in the device. Setting the password comprises sending the appropriate commands in data packets which, when written into the interface to which the cellular device is connected, are able to affect a password change. The server then waits for the appropriate response from the cellular device as received from the client program, makes additional necessary changes to the device and, if needed, replaces the operating system.

OS Upgrade:

Upgrading the operating system according to the presently preferred embodiments comprises retrieving a device password, and replacing the operating system on the connected device. Replacing the operating system comprises sending the appropriate commands in data packets which, when written into the interface to which the cellular device is connected, affect an operating system change. The system then waits for the appropriate response from the cellular device as received from the client program.

A-KEY Change:

Changing the A-Key, or writing the A-KEY on the connected device using the present embodiments comprises sending the appropriate commands in data packets which, when written into the interface to which the cellular device is connected, affect a change in the A-KEY field. The server then waits for the appropriate response from the cellular device as received from the client program.

NUM Change:

Changing the NUM key or writing the NUM into the cellular device preferably comprises sending appropriate commands in data packets which, when written into the interface to which the cellular device is connected, affect a change in the NUM field. The server then waits for the appropriate response from the cellular device as received from the client program.

Read Phone Book:

Reading the phone book of a cellular device according to the present embodiments preferably comprises sending the appropriate commands in data packets which, when written into the interface to which the cellular device is connected, return the information stored in the device's phone book in it's own, proprietary format. The server then waits for the appropriate response from the cellular device as received from the client program. If the phone book information is in a valid format, it may then be converted into a more general format, for example that shown in table 10 below.

Write Phone Book:

This service is only applicable if a phone book has been read and needs to be written somewhere. If the phone book can be converted to the connected device's proprietary format then it is so converted. Then the phone book is written into the next device by sending the appropriate commands in data packets which, when written into the interface to which the cellular device is connected, affect a phone book change.

TABLE 10

Phonebook format

| Field name | Field type | Can be empty? |
| --- | --- | --- |
| Phone number | String | No |
| Name | String | No |
| Cell number | Number | No |
| Default cell dial | Boolean | No |
| Additional information | String | Yes |

It is expected that during the life of this patent many relevant cellular communication devices, cellular networks, network protocols and systems will be developed and the scope of the terms herein, particularly of the term "cellular device", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A cellular communication device comprising a processor, a memory and a data mode, said data mode allowing reading and writing of data in said memory and changing of settings on said cellular communication device, said settings changeable in said data mode comprising personal data, device configuration data and technical data relating to the specific device;
   wherein said cellular communication device further comprises an access restrictor that restricts use of said data mode in response to receipt of a security setting unique to said cellular communication device;
   wherein said device unique security setting is generated remotely and provided to the cellular communication device using a predetermined communication protocol before use of the data mode;
   said data mode permitting a file transfer in an active connection to and from said cellular communication device; wherein said device unique security setting is dynamically changed after use of said data mode, wherein said predetermined communication protocol is managed by said cellular communication device in association with a client program, and said cellular communication device is configured to carry out one member of the group consisting of:
   setting said cellular communication device into said data mode when it determines that said device unique security setting is correct; and
   monitoring said active connection, and disabling said data mode when said active connection is not active.

2. The cellular communication device of claim 1, wherein said memory in said cellular communication device includes address data modifiable in said data mode in accordance with data in an external data source.

3. The cellular communication device of claim 1, wherein said data mode permits modification of data stored in an external data source in accordance with address data stored on said cellular communication device.

4. A cellular communication device having a processor, memory and a data mode, said data mode allowing reading and writing and changing of data and settings on said cellular communication device, including storing, modifying or replacing an operating system stored in said memory in an active connection; said data and settings comprising personal data, configuration data and technical data relating to said cellular communication device, said cellular communication device further comprising an access restrictor to restrict use of said data mode in accordance with a device unique security setting, wherein said device unique security setting is obtained remotely and provided to said cellular communication device before the access data mode is used, wherein said device unique security setting is dynamically changed after use of said data mode, the cellular communication device being configured to carry out one member of the group consisting of:
   using said data mode when it determines that said device unique security setting is correct; and
   monitoring said active connection, and disabling said data mode when said active connection is not active.

5. The cellular communication device of claim 1, wherein said device unique security setting is one member of the group consisting of a software setting, a security certificate, a signature, a coding configuration for an instruction, a dynamic password, and a one-time password.

6. The cellular communication device of claim 1, wherein said unique security setting is constructed using one member of the group consisting of: one cellular communication device specific data item and one random data item, and two cellular communication device specific data items and two random data items.

7. The cellular communication device of claim 1, wherein said unique security setting is provided to said cellular communication device via a predetermined communication protocol.

8. The cellular communication device of claim 5, wherein said unique security setting is provided to said cellular communication device using a predetermined communication protocol, said predetermined communication protocol comprising one member of the group consisting of:
   a specified sequence of communication packets, and a specified structure of communication packets.

9. The cellular communication device of claim 1, wherein said access restrictor restricts use of said data mode to an active connection with a predetermined secure server.

10. The cellular communication device according to claim 5, wherein said active connection is identified via said unique security setting.

11. The cellular communication device of claim 7, wherein said unique security setting is one member of the group consisting of a coding configuration for instructions, a dynamic password, and a one-time password.

12. The cellular communication device of claim 7, wherein said device unique security setting is constructed using one member of the group consisting of:
   at least one cellular communication device specific data item and at least one random data item, and two cellular communication device specific data items and two random data items.

13. The cellular communication device of claim 7, wherein said predetermined communication protocol comprises one member of the group consisting of:
   a specified sequence of communication packets, and
   a specified structure of communication packets.

14. The cellular communication device of claim 8, wherein said predetermined communication protocol is managed by said cellular communication device in association with a client program.

15. The cellular communication device of claim 14, wherein said client program is located externally of said cellular communication device.

16. The cellular communication device of claim 1, further comprising a configuration enabler for enabling or disabling use of said data mode in response to said unique security setting.

17. A cellular communication device comprising a processor, a memory and a data mode, said data mode allowing reading and writing of data and changing of settings on said cellular communication device by an active connection;
   said settings comprising personal data, device configuration data and technical data relating to said cellular communication device;
   said cellular communication device further comprising an access restrictor to restrict use of said data mode in response to a cellular communication device unique security setting;
   wherein said device unique security setting is obtained remotely and provided to the cellular communication device before use of the data mode; said data mode being usable for transfer of icons to the cellular communication device; and
   wherein said cellular communication device is associated with a client program for managing a predetermined communication protocol, and carrying out one member of the group consisting of:
   setting said cellular communication device into said data mode when said device unique security setting is correct; and
   disabling said data mode when said active connection is no longer active.

18. A server for supporting data configuration operations at a plurality of cellular communication devices, said cellular communication devices each comprising a processor, a memory and a data mode for allowing reading and writing of data into said memory and changing of settings on said cellular communication device;
   said settings comprising personal data, device configuration data and technical data relating to the specific cellular communication device;
   said each cellular communication device further comprising an access restrictor to restrict use of said data mode in accordance with a unique security setting provided by said server to said each cellular communication device in a predetermined communication protocol;
   said unique security setting being provided by said server to said each cellular communication device in real-time before use of the data mode by each cellular communication device respectively; and
   wherein use of the access data mode by said each cellular communication device permits the server to install, upgrade, modify, reconfigure or replace an operating system of stored on said cellular communication device via an active connection when said device is in said data mode, wherein said predetermined communication protocol is managed by said cellular communication devices in association with at least one client program, and wherein said devices are respectively configured to carry out one member of the group consisting of:
   setting said cellular communication device into said data mode when said device unique security setting is correct; and
   disabling said data mode when said active connection is not active.

19. A method of restricting access to a data mode of each one of a plurality of cellular communication devices, each of said devices further comprising a processor and a memory, said data mode allowing reading and writing of data into said memory to change settings on each said cellular communication device, said settings comprising personal data, device configuration data and technical data relating to the specific cellular communication device, the method being carried out remotely at a server using an active connection and comprising:
   storing device dependent information of each of said plurality of cellular communication devices;
   creating unique security settings for each of said plurality of cellular communication devices using said cellular communication device dependent information,
   providing said unique security settings to said respective cellular communication devices remotely in real-time before the data mode is used using a predetermined communication protocol;
   configuring each of said plurality of cellular communication devices to enable access to said data mode in response to a respective unique security setting; and
   enabling one member of the group of actions to be performed by one of said cellular communication devices, the group consisting of transferring icons, transferring a file, installing an operating system, upgrading an operating system, modifying an operating system, reconfiguring an operating system and replacing an operating system, said action being carried out when said respective cellular communication device is in said data mode; and managing said predetermined communication protocol using a client program for one member of the group consisting of:
enabling entry into said data mode when said cellular communication device determines that said device unique security setting is correct; and
disabling said data mode when said active connection is no longer active.

20. The cellular communication device of claim 5, wherein said data and settings are provided to the cellular communication device using a predetermined communication protocol, said predetermined communication protocol comprising one member of the group consisting of:
a specified sequence of communication packets, and a specified structure of communication packets.

* * * * *